Patented Oct. 8, 1935

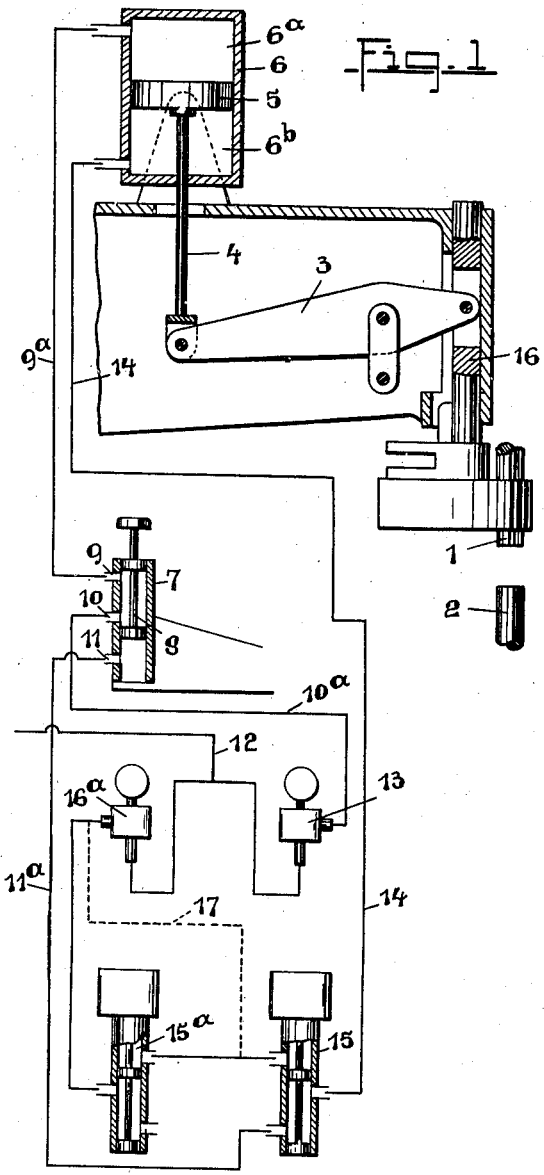

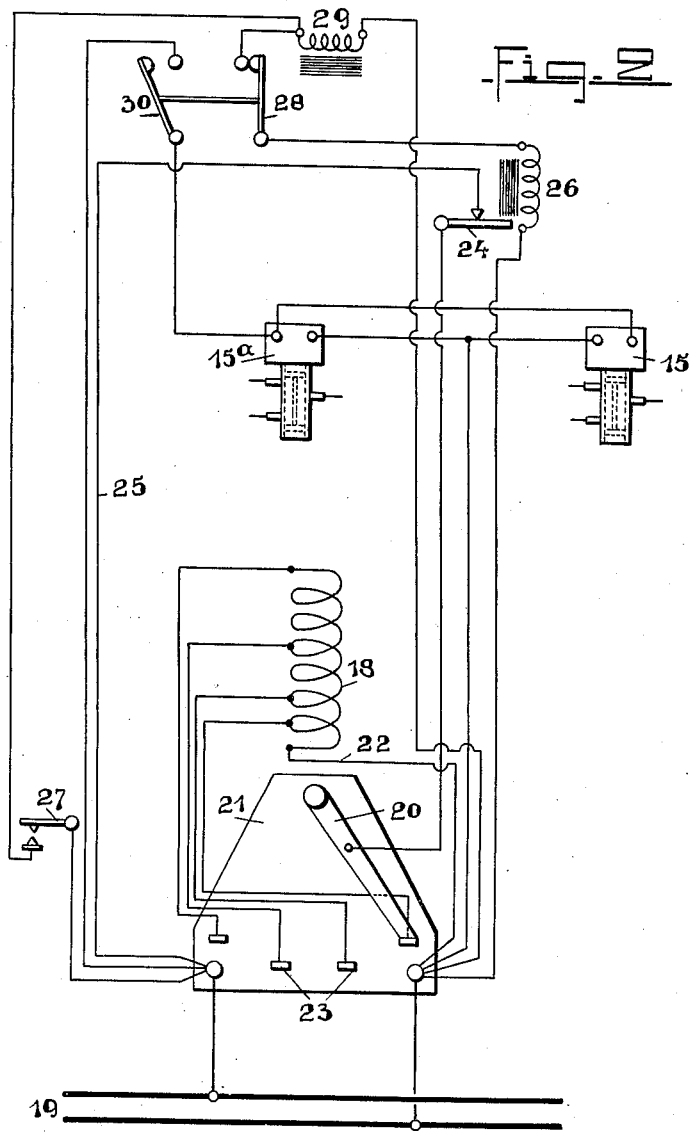

2,016,728

UNITED STATES PATENT OFFICE 2,016,728

METHOD AND APPARATUS FOR ELECTRIC RESISTANCE WELDING OF METALS

David Sciaky, Paris, France

Application March 2, 1934, Serial No. 713,753
In Great Britain March 4, 1933

7 Claims. (Cl. 219—4)

The present invention relates to electric resistance welding of metals.

It is known that during the electric welding of metals, the latter lose a great part of their resilience in consequence of the thermal treatment to which they are subjected during such welding.

According to the present invention, a part of the resilience lost during the operation of welding proper, carried out in the customary manner is restored to the metal by increasing the pressure of the electrodes upon the work immediately after the latter is welded, this final pressure being greater per unit area of the surfaces than the tensile breaking stress of the metal.

Thus for the electric resistance welding of hoops made from the aluminium alloy known under the registered trade-mark "Duralumin", the parts to be welded are first subjected in the usual manner to a welding pressure which is about 5.5 kgs. per sq. mm. and the welding current is then passed through the metal. As soon as the parts are welded together, they are subjected to a pressure which is of the order of 55 kgs. per sq. mm., by exerting a suitable force upon the movable electrode. This pressure which is definitely greater than the tensile breaking stress of the metal treated, namely about 40 kgs. per sq. mm., has for its effect to restore to the duralumin a great part of the resilience lost during the welding proper, because of the mechanical action exerted thereon. It is to be noted that so high a pressure could not be employed during the welding proper because the contact between the surfaces to be welded would be rendered too intimate, and the ohmic resistance would become too small for obtaining a sufficient evolution of heat for the welding operation.

In order to carry out the method according to the invention various devices can be utilized; in particular in the case of a resistance welding machine in which the movable electrode is subjected to the action of a piston travelling in a compressed fluid cylinder, there can be utilized a device such as that which will be described hereinafter.

In this description, reference is made to the accompanying drawings, in which:

Fig. 1 is a diagrammatic view of the installation;

Fig. 2 represents the electrical connections of the controlling apparatus.

As shown in Fig. 1, the welding apparatus comprises in the usual manner a movable electrode 1 and a stationary electrode 2 facing the former. The movable electrode is actuated by means of a rod 16 and a lever 3, by the rod 4 of a piston 5 travelling in the cylinder 6. When a fluid under pressure is admitted into the upper end 6a of the cylinder, it causes the electrode 1 to rise. Conversely, if the fluid under pressure is made to act in the lower end 6b, the two electrodes are brought together and welding pressure is exerted upon the parts to be welded.

The distribution of the pressure fluid in the cylinder 6 is effected by means of a distributor 7 controlled by a pedal. This distributor consists of a piston valve 8, which according to its position in relation to the ports 9, 10 and 11, produces the rise or descent of the movable electrode and the application of pressure thereto.

In the position represented in Fig. 1, the compressed fluid (for instance air) derived from any available source through the pipe 12 and brought to the desired pressure through a reducing valve 13, is introduced into the upper end 6a of the cylinder, producing the rise of the electrode 1. In this position, the lower end 6b of the cylinder is placed in communication with the atmosphere through a pipe 14, an electromagnetically operated valve 15, a pipe 11a and the lower end of the distributor 7.

In order to cause the electrode 1 to descend and to produce the welding pressure, the valve 8 of the distributor 7 is pushed down so as to place the pipe 9a in communication with the atmosphere and to connect the two pipe lines 10a and 11a. The position of the electromagnetically operated valve 15 not having changed, it is seen that the fluid under pressure coming from the reducing valve 13 is brought into the lower end 6b of the cylinder 6 and that the descent of the electrode 1 and the application of pressure thereto take place successively.

As represented the pipe 12 is likewise connected to a reducing valve 16a giving at its outlet a much higher pressure than that at the outlet from the reducing valve 13.

The reducing valve 16a is itself in communication with the electromagnetically operated valve 15 through the pipe 17. As will be explained hereinafter, as soon as the welding operation is completed, the valve 15 rises automatically, connecting the pipes 17 and 14. At this moment the final maximum pressure is exerted in the lower end 6b of the cylinder 6 and consequently upon the welded parts, in order to improve their mechanical properties.

Instead of a single electromagnetically operated valve, there can be utilized two valves 15 and 15a arranged in series at the exit from the reducing valve 16a. In this way, the arrangement prevents any leakage of compressed air which may take place in the valve 15 from affecting the satisfactory operation of the device when effecting the displacement of the movable electrode and applying the welding pressure.

The application of voltage to the welding transformer as well as the actuation of the valves 15 and 15a can be produced, according to the invention, in the following manner (see Fig. 2):

The welding transformer has its primary winding 18 fed by any suitable supply 19. This transformer is provided with multiple tappings and is connected on the one hand to the supply system through the line 22 and on the other hand to the contact studs 23 of a multi-way switch 21 of which the movable contact arm 20 is connected to the supply system by means of a contactor 24 in series with the line 25. The operating coil 26 of this contactor is energized by the supply system and its current feed can be interrupted by means of a switch 27 actuated for example by the operator when he pushes the distributor valve 8 to the end of its movement, and also by an intermediate relay 28—29. The magnet winding 29 of this relay is mounted in shunt across the switch arm 28 of the relay and the coil 26.

Lastly, the electromagnetically operated valves 15 and 15a are themselves connected in parallel to one another and fed by the supply system through a switch arm 30 mechanically connected to the switch arm 28. This mechanical coupling is such that when the contact arm 28 opens its circuit, the contact arm 30 closes the other circuit, and the valves 15 and 15a are then excited.

The device functions in the following manner:

When the welding pressure is attained, the switch 27 is closed, either automatically, or by the action of the operator when he pushed the distributor valve 8 to the end of its movement. At this moment the contact arm 28 is in the closed position and it does not open straight away because the time constant of the relay 29 is relatively high. The winding 26 therefore becomes excited and it causes the closing of the contactor 24 and therefore of the primary circuit of the transformer 18. The time constant of the relay winding 29 is such that the contact arm 28 opens the circuit as soon as the welding operation is terminated. At this moment the winding 26 is not excited and the contactor 24 operates to open the primary circuit of the transformer 18. At the same time, the movable contact arm 30 coupled with the contact arm 28, closes the exciting circuit of the electromagnetically operated valves 15 and 15a which supply compressed fluid at the final maximum pressure to act upon the piston 5 operating the movable electrode (Fig. 1). This pressure ceases as soon as the operator releases the valve of the distributor 7, or else automatically after a time which may be made variable at will.

While I have described what I deem to be a practical and efficient embodiment of my invention, it should be well understood that I do not wish to be limited thereto as there might be changes made in the arrangement, disposition and form of the parts without departing from the principle of my invention as comprehended within the scope of the appended claims.

What I claim is:

1. In the electrical resistance welding of metals, the method which comprises, applying the parts to be welded together against each other with the usual welding pressure, causing electric current to flow therethrough for a certain time while this pressure is being applied so as to weld these parts together, and immediately thereafter applying to these parts a pressure per unit of area higher than the ultimate tensile strength of the metal of which these parts are made.

2. An apparatus for the electrical resistance welding of metals which comprises, in combination, means for applying the parts to be welded together against each other with the usual welding pressure, means for causing electric current to flow through said parts for a certain time while this pressure is being applied so as to weld these parts together, means for switching off this current and means for immediately after increasing this pressure to a value higher per unit of area than the ultimate tensile strength of the metal of which these parts are made.

3. An apparatus for the electrical resistance welding of metals, which comprises in combination, two electrodes at least one of which is movable, means for moving this electrode and applying the welding pressure thereto, a circuit for the welding current, means for switching current on and off in said circuit, and means operative by the switching off of said current in said circuit for applying to said electrode a presure higher than this welding pressure.

4. An apparatus for the electrical resistance welding of metals, which comprises in combination, two electrodes at least one of which is movable, a cylinder, a piston in said cylinder operatively connected with said movable electrode, a source of fluid under pressure, a pressure reducing device, means for connecting said source of fluid under pressure with said cylinder through said pressure reducing means, so as to move this electrode and apply the welding pressure thereto, a circuit for the welding current, means for switching on and off the current in said circuit, another pressure reducing device adapted to supply at its outlet a higher pressure than the first mentioned pressure reducing device, and means operative by the switching off of the current in said circuit for causing the fluid from said source of pressure to flow to said cylinder through said second mentioned pressure reducing device.

5. An apparatus for the electrical resistance welding of metals, which comprises in combination, two electrodes at least one of which is movable, a cylinder, a piston in said cylinder operatively connected with said electrode, a source of fluid under pressure, a pressure reducing device, a distributing valve adapted to normally permit fluid under pressure to flow from said source to said cylinder through said pressure reducing device, so as to move the movable electrode and apply the welding pressure thereto, means for controlling the flow of compressed fluid to said cylinder, a circuit for the welding current, means for switching on and off the current in said circuit, another pressure reducing device adapted to supply at its outlet a higher pressure than the first mentioned pressure reducing device, and electromagnetic means operative by the switching off of the current in said circuit for moving said distributing valve into the position in which it causes the fluid from said source of pressure to flow to said cylinder through said second mentioned pressure reducing means.

6. An apparatus for the electrical resistance welding of metals, which comprises in combination, two electrodes at least one of which is movable, a cylinder, a piston in said cylinder operatively connected with said electrode, a source of fluid under pressure, a pressure reducing device, a distributing valve adapted to normally permit fluid under pressure to flow from said source to said cylinder through said pressure reducing device, so as to move the movable electrode and apply the welding pressure thereto, means for controlling the flow of compressed fluid to said cylinder, a welding transformer, means for closing the primary circuit of said transformer, a time switch in said primary circuit adjusted to open when the welding operation is terminated, another pressure reducing device adapted to furnish at its outlet a higher pressure than the first mentioned pressure reducing device, electro-magnetic means, controlled by said time switch for causing said distributing valve to come into the position in which it causes the fluid from said source to flow into said cylinder through said second mentioned pressure reducing device when said time switch opens.

7. An apparatus according to claim 5 further comprising a second valve connected in series with the distributing valve.

DAVID SCIAKY.